Dec. 6, 1960 C. A. RYPINSKI, JR 2,963,552
TELEPHONE SUBSET CURRENT GENERATOR
Filed July 29, 1957
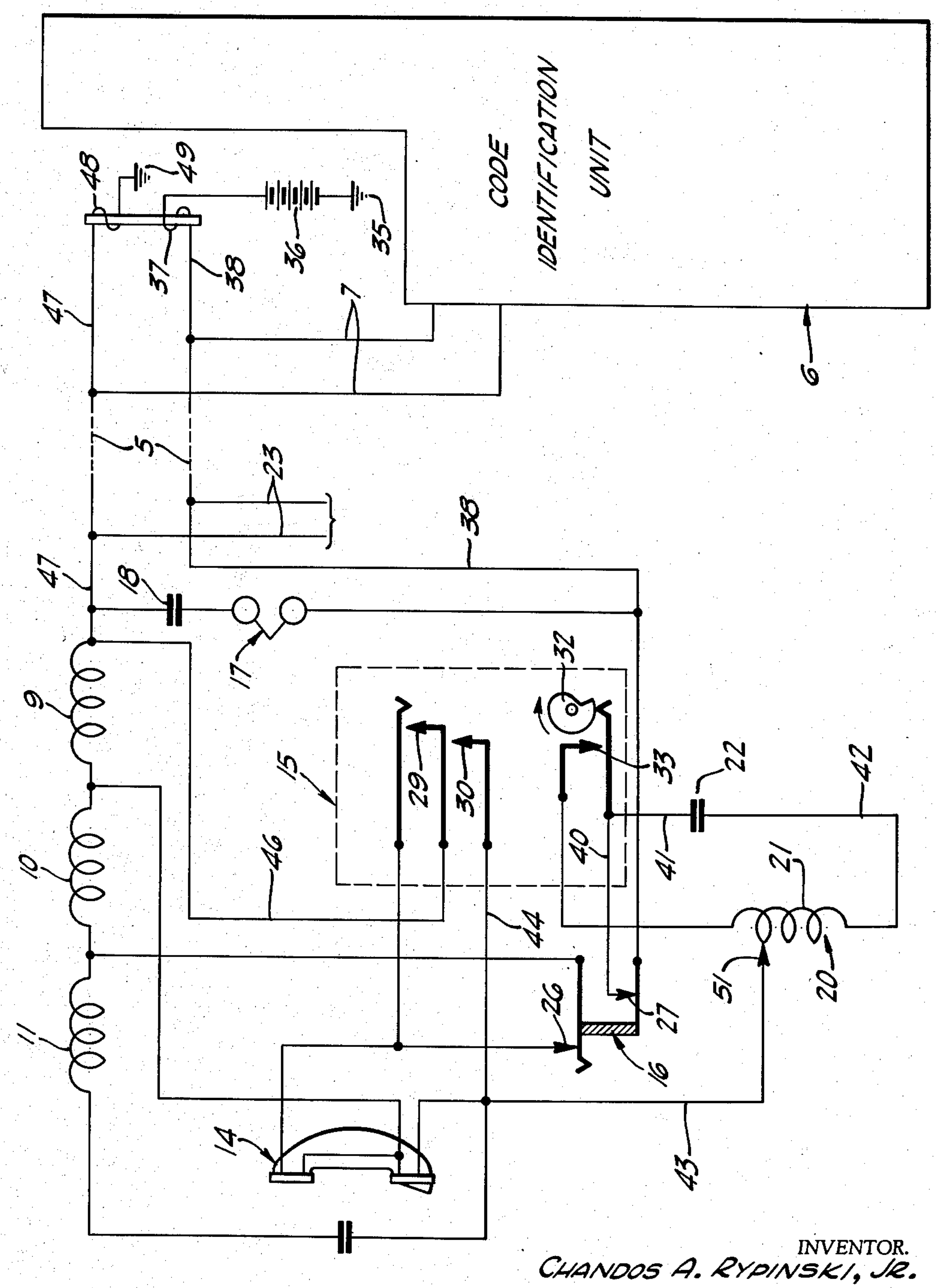
INVENTOR.
CHANDOS A. RYPINSKI, JR.
BY
[signature]
ATTORNEY United States Patent Office 2,963,552
Patented Dec. 6, 1960

2,963,552

TELEPHONE SUBSET CURRENT GENERATOR

Chandos A. Rypinski, Jr., Sherman Oaks, Calif., assignor to Ralph D. Collins, Beverly Hills, Calif.

Filed July 29, 1957, Ser. No. 674,676

6 Claims. (Cl. 179—17)

This invention relates to telephone communication apparatus, such as telephones whereby a calling subscriber's subset will be identified at a central station, and particularly to the subset circuit for generating the identifying signal.

The use of different systems for identifying subscribre's subsets are known, a general type of subset current generation being disclosed and claimed in copending application, Ser. No. 439,007, filed June 24, 1954, and copending application, Ser. No. 527,113, filed August 8, 1955, now Patent No. 2,849,538 of August 26, 1958, both applications and the present application having common ownership.

Prior non-coded ground identification systems are limited to two-party identification, are subject to bad ground connections, and require proper poling. Coded ground systems are also subject to bad ground conditions, are not of universal application, require more elaborate test equipment, and a de-centralized test center.

The system of this invention requires no grounds, it will operate with all present-day line equipment and over conventional line facilities, will provide positive identification for individual and party lines, requires no mechanical adjustment beyond normal maintenance, will permit centralized testing, requires no poling, and utilizes the minimum of equipment at the subscriber's subset. The first above-mentioned copending application utilizes a transistor oscillator tuned to a specific frequency, or a tuned standard transformer circuit which is shock-excited to provide the identification current in the form of a damped wave. The above second-mentioned application, now Patent No. 2,849,538, utilizes a simplified tuned audio transformer shock-excited oscillator, or a split capacity shock-excited oscillator. The type of shock-excited oscillators shown in the second above-mentioned application are compact and provide dependable means for obtaining the identifying signal, since the circuits employ simple, inert, or passive networks for generating the identifying currents. The present invention has all the above advantages but still further reduces the elements required to generate the identifying currents. It also permits the charging of a single condenser to the full voltage of the central office battery when the pulsing contacts are open, assuming a small RC time constant. Therefore, the full voltage of the battery is obtained on the condenser regardless of the loop resistance within the limits determined by the RC product, which improves the reliability of the circuit.

The principal object of the invention, therefore, is to facilitate the identifying of subscriber's stations or subsets of a telephone system in an extremely simple, accurate, and economical manner.

Another object of the invention is to provide an improved system of identification of telephone subscribers' sets or subsets.

A further object of the invention is to provide an improved system for generating identification signals at a telephone subscriber's station or subset.

A still further object of the invention is to provide a simple, compact and dependable shock-excited oscillator using the minimum of elements for generating a subset identifying current regardless of the loop resistance within predetermined limits.

A better understanding of this invention may be had from the following detailed description when read in connection with the accompanying drawings, in which the single figure is a combination schematic and diagrammatic drawing of a telephone subset circuit embodying the invention.

Referring now to the drawing, a subscriber's station or subset is shown to the left of the dotted lines 5, these lines indicating various distances of separation between subsets and the central station equipment indicated within the block 6, and connected to lines 5 by conductors 7. The details of the central office equipment within the block 6 are shown in Fig. 1 of the copending application, Ser. No. 527,113, filed August 8, 1955, now Patent No. 2,849,538, referred to above, this figure showing the tuned circuits for selecting the subset identifying signals.

The subset includes a standard induction coil having three sections 9, 10, and 11, a standard transmitter-receiver unit 14, a standard dialing unit shown within the broken lines 15, a standard hook switch 16, and a standard bell ringer 17 with its blocking condenser 18. In addition to this standard subset circuit is a shock-excited oscillator shown generally at 20 composed of a tapped inductor coil 21 in series with a condenser 22. The conductors 23 indicate that other subscribers' lines may be connected to the transmission pair 5.

As mentioned above, the purpose of the invention is to generate a signal at a telephone subset for transmission to the telephone central office which will identify the subset. The signal is generated by the oscillator 20 when the condenser 22 is charged from the central office by the normal action of the calling subscriber, and then discharged through coil 21 by the dialing operation, the oscillator being tuned to provide a damped wave of a certain predetermined frequency, each subset oscillator on the same party line being tuned to a different frequency. When a subscriber removes the unit 14 from the hook switch 16, switch hook contacts 26 and 27 are made. Now, when the dial 15 is actuated to call a number, shunting contacts 29 and 30 are made. Upon release of the dial, the cam 32 will make and break the pulsing contacts 33 which are normally open.

The central office direct current voltage is impressed on the condenser 22 upon the making of contacts 27 and 30. This circuit is from ground 35, over a central office battery 36, pulsing relay winding 37, conductor 38, switch hook contacts 27, conductor 40, conductor 41 to condenser 22. The other side of the condenser circuit is from condenser 22, over conductor 42, coil 21, tap 51, conductor 43, conductor 44, closed contacts 30, conductor 46, conductor 47, and pulsing relay winding 48 to ground 49. This circuit will charge condenser 22 with the full voltage of the central office battery 36 regardless of the loop resistance 5 provided the RC time constant is sufficiently small and the loop resistances are within the values normally encountered.

It will be noted that the condenser 22 is charged over a portion of the coil 21 during the time pulsing contacts 33 are open. The tap 51 may be selected at a point from 5 to 10 percent of the turns of the coil 21, the position of this tap controlling the effective line loading for a certain selection of a fixed value for condenser 22. Although the coil 21 is shown tapped at a certain point on the coil, it is to be understood that the tapped connection could be advanced to the end of the coil if a corresponding adjustment were made in the value of the CL ratio to control the line loading. The line loading of the resonant circuit is determined by the square of the turns ratio between the tap and the whole of coil 21. It will be noted that the shock-excited resonator circuit 20 uses a single condenser, whereas the shock-excited resonator circuit in Figs. 1 and 2 of the above-mentioned patent uses two condensers. As an example of an operative circuit, coil 21 had 400 turns, tap 51 was at 28 turns, the coil being on a one inch diameter ferrite pot-core with a 0.005 of an inch air gap and producing 1000 cycles with a 0.5 mfd. condenser.

The former circuits disclosed in the above-mentioned copending applications transmitted identifying signals during the times the pulsing contacts 33 were open. In the present circuit, however, the identifying signal is transmitted during the times when the contacts 33 are closed, since these are the times the damped wave is generated.

As mentioned above, the condenser 22 is charged when contacts 27 and 30 are closed over the circuit traced above. Now, upon the closing of contacts 33, the circuit including coil 21 and condenser 22 will oscillate as the condenser 22 is discharged through the coil 21. When this occurs, the damped generated currents will be transmitted to the central office by a circuit from condenser 22 over conductor 41, conductor 40, closed switch hook contacts 27, and conductor 38, to one of the conductors 7. The remainder of the circuit is over conductor 42, tap 51, conductor 43, conductor 44, closed shunt contacts 30, conductor 46, and conductor 47, to the other conductor 7 at the central station.

Thus, by use of a coil and a single condenser, which will be charged to the full voltage of the central station regardless of loop resistance within practical limits, greater reliability of current generation at a higher initial voltage will be obtained. Furthermore, only a single condenser is required which permits the condenser and coil to be easily accommodated within the present-day telephone subscribers' subsets. The detection of the identification signal generated by the shock-excited resonator during the time the pulsing contacts 33 are closed is simplified because transient currents from the central office pulsing relay 37—48 are not present on the line during the transmission of the identifying currents.

I claim:

1. In a telephone subscriber's identification system, the combination of a telephone subset having switch hook contacts, shunting contacts, and pulsing contacts, central office equipment including a direct current potential source for supplying direct current potential to said subset, said equipment also including means for receiving currents generated at said subset, a shock-excited resonator circuit including a tapped coil in series with a condenser connected across said pulsing contacts, the closing of said pulsing contacts discharging said condenser through said coil, and circuit connections between said central office direct current potential source and said shock-excited resonator circuit through closed shunting contacts and closed switch hook contacts for transmitting generated currents to said central office equipment.

2. A telephone subscriber's identification system in accordance with claim 1 in which the tap on said coil is connected through said closed shunting contacts with said central office direct current potential source.

3. A shock-excited resonater circuit for a telephone subset to generate an identifying signal at said subset for transmission to a central station comprising a direct current source of potential at said central station, pulsing contacts at said subset, a condenser at said subset, a coil at said subset, said coil and said condenser being adapted to be connected in series across said pulsing contacts, and connections between said potential source and said condenser from said direct current source when said pulsing contacts are open for charging said condenser, the closing of said pulsing contacts discharging said condenser through said coil for generating a damped wave for transmission over said connections to said central station.

4. A shock-excited resonator circuit in accordance with claim 3 in which said subset includes switch hook contacts and dialing contacts, said connections including certain closed switch hook contacts and certain closed dialing contacts.

5. A system for generating an identification signal of a predetermined frequency at a telephone subset connected to a central office having a direct current potential source comprising a coil in said subset, a condenser in said subset, said subset including switch hook contacts, shunting contacts and pulsing contacts, all of said coil and said condenser being connected in series across said pulsing contacts, and connections between a portion of said coil, said condenser, said switch hook contacts, said shunting contacts and said potential source to charge said condenser when said switch hook and shunting contacts are closed and said pulsing contacts are open, said predetermined frequency signal being generated when said pulsing contacts are closed.

6. A system in accordance with claim 5 in which said central connections transmit said generated signal to said central office.

References Cited in the file of this patent

UNITED STATES PATENTS

| | | |
|---|---|---|
| 1,857,827 | Stacy | May 10, 1932 |
| 1,864,082 | Massoneau | June 21, 1932 |
| 1,864,524 | Bragg | June 28, 1932 |
| 2,228,113 | Hersey | Jan. 7, 1941 |
| 2,277,228 | Hecht | Mar. 24, 1942 |
| 2,281,508 | Landstrom | Apr. 28, 1942 |
| 2,283,610 | Mohr | May 19, 1942 |
| 2,562,594 | Bielenberg | July 31, 1951 |
| 2,717,279 | Matlack et al. | Sept. 6, 1955 |
| 2,782,259 | Dimond | Feb. 19, 1957 |
| 2,806,091 | Lewis | Sept. 10, 1957 |
| 2,889,410 | Hatton | June 2, 1959 |